United States Patent
Al-Saud et al.

(10) Patent No.: US 9,476,569 B2
(45) Date of Patent: Oct. 25, 2016

(54) APPARATUS LIGHT PEN AND ITS USE

(71) Applicant: King Abdulaziz City for Science and Technology (KACST), Riyadh (SA)

(72) Inventors: Turki Saud Mohammed Al-Saud, Riyadh (SA); Rashid Mohammed Altamimi, Riyadh (SA); Vladimir Enokovich Agabekov, Minsk (BY); Alexander Anatolievich Muravsky, Minsk (BY); Nikolai Stanislavovich Kazak, Minsk (BY); Vladimir Nikolaevich Belyi, Minsk (BY); Nikolai Anatolievich Khilo, Minsk (BY); Anatoli Ivanovich Mitskovets, Minsk (BY); Svetlana Nikolaevna Kurilkina, Minsk (BY); Anatol Anatolievich Ryzhevich, Minsk (BY)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 60 days.

(21) Appl. No.: 14/715,589

(22) Filed: May 18, 2015

(65) Prior Publication Data

US 2015/0338066 A1 Nov. 26, 2015

(51) Int. Cl.
*F21V 9/14* (2006.01)
*F21V 13/02* (2006.01)
*F21V 5/04* (2006.01)
*F21L 4/00* (2006.01)
*G02B 19/00* (2006.01)
*G02B 27/20* (2006.01)
*G02B 27/28* (2006.01)

(52) U.S. Cl.
CPC .................. *F21V 13/02* (2013.01); *F21L 4/00* (2013.01); *F21V 5/04* (2013.01); *F21V 9/14* (2013.01); *G02B 19/0014* (2013.01); *G02B 19/0066* (2013.01); *G02B 27/20* (2013.01); *G02B 27/283* (2013.01); *G02B 27/286* (2013.01)

(58) Field of Classification Search
CPC ............. F21L 4/00; F21L 13/00; F21L 7/00; F21L 2005/00; F21V 13/02; F21V 13/12; F21V 5/04; F21V 9/14; G02B 19/0014; G02B 27/20; G02B 27/30; G02B 27/283; G02B 27/286
USPC .......................................... 362/19, 109, 119
See application file for complete search history.

(56) References Cited

U.S. PATENT DOCUMENTS

| 6,767,110 B2 * | 7/2004 | Cooper .............. G01N 21/6447 250/504 H |
| 8,167,449 B2 * | 5/2012 | Duerr ...................... F21L 4/027 362/120 |
| 2004/0061950 A1 * | 4/2004 | Chen ..................... G02B 6/0023 359/709 |
| 2009/0021821 A1 * | 1/2009 | Roth ................... G02B 27/1026 359/247 |
| 2013/0071103 A1 * | 3/2013 | Harris ..................... G02B 27/28 396/544 |

* cited by examiner

*Primary Examiner* — Ali Alavi
(74) *Attorney, Agent, or Firm* — Geeta Kadambi Riddhi IP LLC

(57) ABSTRACT

A light pen for writing on a polarized light sensitive surface is disclosed. Light emitting diodes emit non-polarized light and a polarization block comprising of a truncated cone shaped collimating optical element, a broad band polarization divider, a broadband semi-wave plate, shifting bi-prism and light beam coupler are built to convert the non-polarized light to be converted to polarized uniform intensity light that is focused using a set of projection lens to a writing surface. The said light pen can be used for creating non erasable writing on many types of articles, documents, and records that would provide verification of authenticity and security.

11 Claims, 2 Drawing Sheets

APPARATUS LIGHT PEN AND ITS USE

CROSS REFERENCE TO RELATED APPLICATION

This application claims priority to Republic of Belarus Patent Application No. a20140281 filed on 20 May 2014. The pending Republic of Belarus Patent Application No. a20140281 is hereby incorporated by reference in its entireties for all of its teachings.

FIELD OF TECHNOLOGY

This disclosure relates generally to an apparatus, a light pen that comprises of a light emitting diode (LED) and specific optical elements that modify the LED light. More particularly, it relates to generation of a certain form of radiation using the LED for forming graphical images on various surfaces.

BACKGROUND

At present there are many mechanical and electronic devices different in operation principle and aimed for the formation and recording of graphical images to various carriers. Lead pencil is the most well-known and widely used. Writing lead of the pencil can more or less differ chemically from the graphite, have different color and softness. In most cases the image looks like a wear writing lead on the paper, which is mostly frail and moisture-nonresistant and hence short-lived carrier. Besides, graphite images can be mechanically blurred and effaced.

In every-day use for writing down the graphical information they use pens with one and more writing leads (usually of different colors) possess a rolling writing unit on the tip. These instruments are aimed mostly for writing in paper.

Graphics tablets (pads) for entering graphic information are serially produced and applied. The information is recorded in digital form, but for recording process and its visualization and also for further reading the information from the carrier a program-compatible computer is needed.

Recently a laser electronic pen for entering and writing graphic information has been developed. This device possessing a lead with the ink can write on a usual paper, however, as in the previous case, it is intended for the entering of graphic information mostly in the digital form, so for reading it from the carrier a computer is needed.

Technically closest to the proposed light pen is the light source consisting of a light emitting diode (LED), which generates the radiation in the form of axial and conical components, external collimating optical element in the form of a glass truncated conical lens and the objective in the form of a positive spherical lens mounted with the opportunity of its controllable moving along the optical axis of the device. The light source gives the opportunity to control the size of the light spot in the given plane, however it generates non-polarized radiation of one certain color (depending on LED model), and it is not a completely autonomous device, as for its operation a corresponding power supply is needed, which provides a certain current intensity in the LED. There is a need for a more sophisticated technology for autonomous writing tool that does not require electrical connections.

SUMMARY

Several embodiments for and method of using for a light pen are disclosed. The instant disclosure incorporates a novel feature of producing linearly polarized light. In another embodiment, the linearly polarized light may produce beams of different colors, for example, red, blue and green. In one embodiment, the linearly polarized light having a specific intensity thus produced may be used for writing on a specific surface having a specific thickness. In another embodiment, the power supply to the light pen as an apparatus may be provided by a set of batteries and/or supplied using an electrical circuit. The electrical circuit can be used for recharging the batteries as well.

In one embodiment, a toggle for selecting a specific light emitting diode to produce a light beam, wherein the specific light emitting diode is at least one of a red, green and blue. In another embodiment, a polarization block consisting of a truncated cone shaped collimating optical element, a broad band polarization divider, a broadband semi-wave plate, shifting bi-prism and light beam coupler are disclosed.

In one embodiment, a set of projection lens of different radii are set serially one after another, wherein the set of projection lens is made of at least one of a two, three, four, five and six lenses. More specifically there are a set of four lenses that are being disclosed.

In one embodiment, a method to generate power to light up a light emitting diode. A user can then choose the light emitting diode to emit a specific type of a light beam for writing. In another embodiment, a method to generate an optical radiation using the light emitting diodes in the form of a non-polarized light. In another embodiment, non-polarized light that is non-homogeneous is collected and converted it to a homogeneous non-polarized light using a truncated cone shaped collimating optical element.

In one embodiment, the homogeneous non-polarized light is divided into a first beam and a second beam that are orthogonally linearly polarized beam to each using a broad band polarization divider; the first beam is passed through a broadband semi-wave plate to change the polarization plane to 90 degrees and form a polarized light; the second beam is passed through a prism to convert it into a polarized light; the divided first beam and second beam that is a total polarized light is collimated through a light beam coupler; and the total polarized light is focused using set of projection lens having a specific shape and specific curvature to produce a focused optical system that would be used for writing on polarized light sensitive surface. The radii of each lens in the set of projection lens are different.

In one embodiment, linearly polarized light might have a polarization degree of not less than 0.99. In another embodiment, the aperture for the light beam to exit is adjustable and the surface on which needs to be written has to be perpendicular to the light exiting aperture. In another embodiment, thickness of the surface on which the information may be written or etched or recorded is between 0 to 1 mm for all colors. In another embodiment, the intensity of the color or the light beam is not less than 1.5 mW for the information record to a floppy or hard information carrier, which is sensitive to the linearly polarized light radiation only.

In one embodiment, the apparatus, the light pen, comprises of the following distinctive features: housing, enclosing several optical elements, an energy source, an aperture and an adjustable ring to select the choice of a light beam. In another embodiment, a housing encloses a demountable frame, a casing for joint fixation, positioning and protection of the device components; a power supply block based on standard electro-batteries (optionally accumulator), providing the energy autonomy for the device; and three different light emitting diodes, generating red, blue and green radiation. In one embodiment, a rotary barrel to switch on one of the diodes such as the red, green and blue color LED's. In another embodiment, a lens, truncated glass cone, a polarization divider, an optical rotational element and set of projection lenses to modify the radiation and focus the light beam to perform inscribing on a specific surface.

The apparatus and method of using the same as disclosed herein may be implemented by any means for achieving various aspects, and may be executed using a set of instructions that, when executed by the light pen, cause the light pen to perform any of the operations disclosed herein. Other features will be apparent from the accompanying drawings and from the detailed description that follows.

BRIEF DESCRIPTION OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

An apparatus and method of using the apparatus relates to generation of a certain form of radiation using the LED for forming graphical images on various surfaces are disclosed. Although the present embodiments have been described with reference to specific example embodiments, it will be evident that various modifications and changes may be made to these embodiments without departing from the broader spirit and scope of the various embodiments. This disclosure is a useful model in the area of optics and electronics. The light pen can be used for the formation of graphical images and their recording to hard and floppy carriers, including firm and moisture-resistant ones, sensitive to the linearly-polarized light only, for example at manual marking of the unique products or signing the valuable personal documents. The terminology used in the priority document is slightly different and in this disclosure we have made it more uniform for clarity purposes. The figures and the nomenclature are the comparable.

Figure 1:
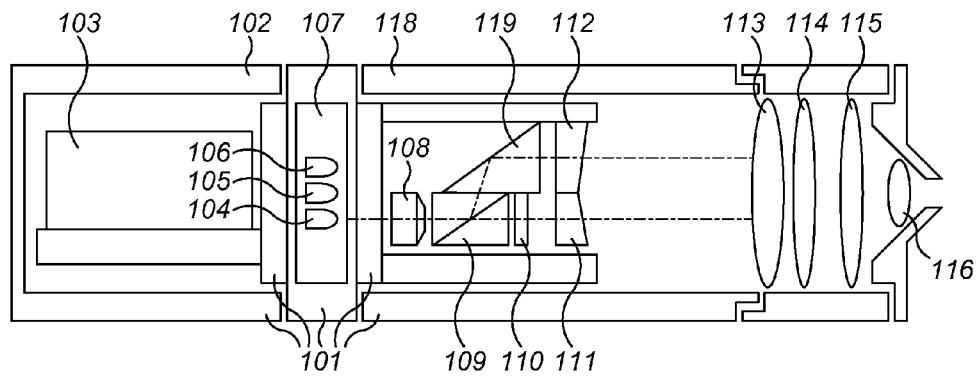
FIG. 1 is a detailed layout and an optical scheme of the light pen, in one embodiment.

FIG. 1 discloses the light pen (the apparatus) contains a light emitting diode (LED) 104, 105 and 106, which generates the radiation in the form of axial and conical components, a truncated cone shaped collimating optical element 108 in the form of a glass truncated conical lens to produce a light spot of a set size and in the set plane. The light pen also possess demountable housing composed of a frame 101 for joint fixation and a casings 102 and 118 to protect the device components; a power supply block 103 to house standard electro-batteries (optionally accumulator), providing the energetic autonomy for the device; and three different light emitting diodes, generating red, blue and green radiation, which are established on a rotary barrel and toggle 107. A polarization divider 109 and 119 to divide a non-polarized light beam emitted from the LED into two orthogonally linearly polarized beams; as first light beams to pass through optical element 110 for the rotation of radiation polarization plane into 90 degrees and the second beam travelling through 119. The first and second beam then travel parallel to each other through the shifting bi-prism and light beam coupler 112 and 111 to travel along its optical axis within 5 mm for the reduction of the diameter of the output light spot in the plane of the end of the device up to 1 mm.

The task of the proposed useful model is to create a compact energetically autonomous source of linearly polarized light with a polarization degree of not less than 0.99, providing the formation of a light beam of any of three (red, blue or green) colors, with the opportunity of a controllable reduction of the illuminated zone diameter in a plane, which is perpendicular to the light propagation direction and goes through one of the ends of the device, up to 1 mm with any color radiation power of not less than 1.5 mW for the information record to a floppy or hard information carrier, which is sensitive to the linearly polarized light radiation only.

The proposed light pen contains a light emitting diode (LED), which generates the radiation in the form of axial and conical components, external collimating optical element in the form of a glass truncated conical lens (the border of a smaller cone base coincides with a local intensity minimum between the axial and conical radiation components and the diameter of a larger cone base provides the transition of about 90% of the energy of the conical component of radiation in the site of the lens establishment, angle и between the conical component and the base is $\theta=\text{arctg}\ [\sin(\alpha_{in})/[(n^2-\sin^2(\alpha_{in}))^{1/2}-1]$, where n is a refraction index of the lens material, $\alpha_{in}$ is in form of a cone angle of the conical component incident to the truncated conical lens in the direction of its maximal intensity), and the objective for the formation of a light spot of the set size and in the set plane. The light pen possess the following distinctive features: it has a housing, containing a demountable frame and a casing for joint fixation, positioning and protection of the device components; a power supply block based on standard electro-batteries (optionally accumulator), providing the energetic autonomy of the device; and three different light emitting diodes, generating red, blue and green radiation, which are established on a rotary barrel with the opportunity of alternating switching on one of the diodes with simultaneous light beam coupling from it to the optical axis of the device; after the collimating optical element in the form of the truncated glass cone a polarization divider is established, which divides a non-polarized light beam into two orthogonally linearly polarized beams; on the way of one output light beams an optical element broadband semi-wave plate for the rotation of radiation polarization plane into 90 degrees; then on the way of each beam optical elements for overlapping the images of imaginary sources of these beams on the optical axis of the objective are established; thus the objective is established with the opportunity of the controllable moving along its optical axis within 5 mm for the reduction of the diameter of the output light spot in the plane of the end of the device up to 1 mm.

The truncated cone shaped collimating optical element, the cut border of which coincides with a local intensity minimum between the axial and conical radiation components and the diameter of a cone base provides the transition of about 90% of the energy of the conical component of radiation through the cone base, thus the angle between the conical surface and the base is $\theta=\text{arctg}\ [\sin(\alpha_{in})/[(n^2-\sin^2(\alpha_{in}))^{1/2}-1]$, where n is a refraction index of the lens material, $a_{in}$ is a cone angle of the conical component in the direction of its maximal intensity; polarization divider 109 and 119; optical element 110 for the rotation of the polarization plane into 90 degrees; optical elements 111 and 112 for coupling the divided light beams along the optical axis of the device; a projection lens consisting of four positive spherical lenses 113, 114, 115, 116 established with the opportunity of the controllable moving along its optical axis within 5 mm. The number of lenses is variable (depends on the glass of lenses and its construction).

The device operates as follows. One of LED 104, 105, 106, connected to power supply 103 and adjusted by rotary barrel switch of radiation color 107 on the optical axis of external collimating optical element 108 (in FIG. 1 LED 104 is settled on the optical axis) generates optical radiation in the form of the axial and conical components. The axial component propagates through the plane surfaces of the basis and cut of the truncated conical lens 108 without any change of divergence. The conical component propagates through the basis and conical surface of lens 108, after this, in the result of refraction, its cone angle is substantially reduced going closer to zero. Both of components possess their own divergences and after conical lens 108 are partially overlapped, hence, after truncated conical lens 108 the light beam has Gaussian-like intensity distribution. After collimating optical element 108 the radiation comes to polarization divider 109 and 119, dividing a non-polarized light beam into two linearly polarized light beams in orthogonal planes. One of these beams propagates through optical element 110 for the rotation of the polarization plane into 90 degrees, after this, polarizations of both of beams become equal. Optical elements 111 and 112 shift the images of imaginary sources of both beams to the optical axis of the objective, after this they are focused by the objective consisting of lenses 113-116 in the vicinity of the plane going through the end of the light pen with the exit aperture in casing 102 in the form of almost round spot. By means of moving of the objective along its optical axis within 5 mm, a focus spot having the diameter not more than 1 mm is adjusted precisely in the plane of the end with the exit aperture.

Possibility of realization of the proposed useful model can be proved by the following facts. At present a great number of light emitting diodes have been already designed and serially produced, many of them generate light radiation consisting of the axial and conical components. In [5] intensity distributions of such two-component light beams generated by LED (for example models 365-1184-ND-X, 75-014-89; 75-036-42, 404-1102-ND) are given. The produced light pen prototype contains 3 LED: LED 365-1184-ND (with radiation wavelength of 465 nm and the divergence of near-axis component of the field of about 6°) is taken as a blue radiation source; LED 75-036-91 (with radiation wavelength of 575 nm and the divergence of 6°) is taken as a green radiation source; LED B5B-436-30 (with radiation wavelength of 660 nm and the divergence of 8°) is taken as a red radiation source. Now there is a technical opportunity and a technology for the production of the truncated conical lenses from optical materials. The external collimating optical element for the reduction of the conicity angle of the conical component of LED radiation, which was produced for the realization of the proposed device, you can see in the photo in the optical details set for the light pen prototype in FIG. 2. It looks like a truncated refractive cone made of glass BK-7. Diameter of the element is 12 mm, height 9 mm, conical surface angle at the base is 23 degree. Calculation of angle θ at the cone base of lens 8 has been conducted in accordance with the formula connecting conicity angle $\alpha_{out}$ of the output beam with conicity angle $\alpha_{in}$ of the input beam of the lens:

$$\alpha_{out}(\theta) = \arcsin[n\sin(\theta - \alpha_1(\alpha_{in}))] - \theta, \text{ where}$$
$$\alpha_1(\alpha_{in}) = \arcsin(\sin(\alpha_{in})/n)). \quad (1)$$

Subject to the output beam is parallel to the optical axis, i.e. $\alpha_{out} = 0$, from (1) we obtain the equation:

$$\theta = \arcsin[n\sin(\theta - \alpha_1(\alpha_{in}))] \quad (2)$$

Solving of the equation (2) for angle θ gives $\theta = \arctg[\sin(\alpha_{in})/[(n^2 - \sin^2(\alpha_{in}))^{1/2} - 1]]$.

Light beams entering the cone within the range of angles of $\alpha_{in} = (6 \div 18)$ degrees, exit from the cone within the range of angles of $\alpha_{out} = (-6 \div 6)$ degrees. Thus the near-axis component of the incident radiation is also limited over the divergence angle within the range of $(-6 \div 6)$ degrees. It means that all radiation entering the cone within the range of $\alpha_{in} = (0 \div 18)$ has the divergence of not more than 6 degrees. About 95% of radiation energy of the used LED with two-component radiation structure occurs in this range of angles. It indicates the opportunity of high enough transformation efficiency. The main radiation losses here can be caused by the Fresnel refection on the edges of optical elements, for their reduction it is reasonable to apply a cone surface blooming on the wavelength of the used radiation. The diameter of the truncated cone base is chosen so that the largest part of LED radiation can propagate through it. The diameter of the cut is chosen so that the light beams incident under the boundary angle (dividing the axial and conical components and in the given case equal to 6 degrees) occur correspondingly on the border of the conical and plane parts of the surface. As the light intensity in this area has its minimum, so the diffraction losses are minimal also. Collimating element almost removes the two-component structure of the beam and reduces the intensity dip in its axis making the diametral intensity distribution in the cross section of the beam Gaussian-like. In the result of transformation the light beams becomes much more collimated, i.e. suitable for the subsequent change of its cross sizes by means of one or several spherical lenses. Requirements to the polarization divider concerning the proposed model are the following: complete angular aperture on the divergence of the incident beam is more than 10 degrees; polarization degree of the output radiation is not less than 0.99; transmission band is in the range of ~450÷650 nm; minimal distortions of the phase front of the output field. The polarization divider based on multi-layer photonic structure and using Brewster effect meets these requirements. Basic requirement to the material of layer of the multi-layer structure is the following: a high step of the refraction index, which can be compared to its average value. The variant of structure containing the layers of silicon dioxide $SiO_2$ with the refraction index of 1.45 and layers of $Nb_2O_5$ with the refraction index of 2.25 has been calculated. These materials possess a high threshold of light damage, and they are cheap and technological at the production of the photonic structures. A photonic structure consists of two substructures different in their period. The first of them contains 5 cells, each of them consists of the layers of $Nb_2O_5$ and $SiO_2$ having the thickness of 83 nm and 126 nm correspondingly. The second substructure contains 5 cells as the previous one, but the thicknesses of layers are 107 nm and 165 nm. These parameters are defined by means of optimization over the spectral width and angular aperture. In general, the photonic structure of the polarization divider operates in the mode of the reflection of s-polarization component of the incident field and the transmission of p-polarized component. The glass totally reflecting prism 119 (included in the polarization divider 109 and 119 produced according to this principle) provides the rotation of distribution of s-polarization component of the light radiation in the direction of the objective optical axis. A broadband semi-wave plate has been used in the produced prototype as optical element 110 rotating the polarization plane of p-polarized component into 90 degrees. The radiation exiting from prism elements 111 and 112 is focused by the four-lens objective consisting in this very case of 4 positive spherical lenses, though the construction may be different. In the device construction there is an opportunity of moving the objective along the optical axis in 5 mm from the calculated position, providing more precise adjustment of the device. Due to the high radiation divergence the lenses are produced from a heavy crown glass TK21 and possess small radii of curvature: radii of curvature of the first lens are 136.14 mm and −109.9 mm; radii of curvature of the second lens are 41.3 mm and 124.74 mm; radii of curvature of the third lens are 21.38 mm and 28.256 mm. Light diameter of the first lens is 41.7 mm, it usually defines the cross size of the device in total. Measured focal distance of the objective is 27 mm. Summed light field in the focal plane of the objective looks like an almost round spot with visible diameter of 1 mm. Power supply of the produced prototype of the light pen is realized by means of the power supply block (see FIG. 3) based on 2 standard AA batteries, they may be both conventional and accumulator. This power supply block provides continuous autonomous operation of the light pen during about 70 hours (depending on the parameters and quality of the used batteries). In spite of the complex construction the prototype of the light pen has compact overall sizes: diameter is 52 mm, length is 246 mm, at this it provides high output capacity of linearly polarized radiation P in all wavelengths at working current 25 мA: P($\lambda$=465 nm)=3.2 mW, P($\lambda$=575 nm)=1.8 mW, P($\lambda$=660 nm)=2.4 mW.

Figure 2:
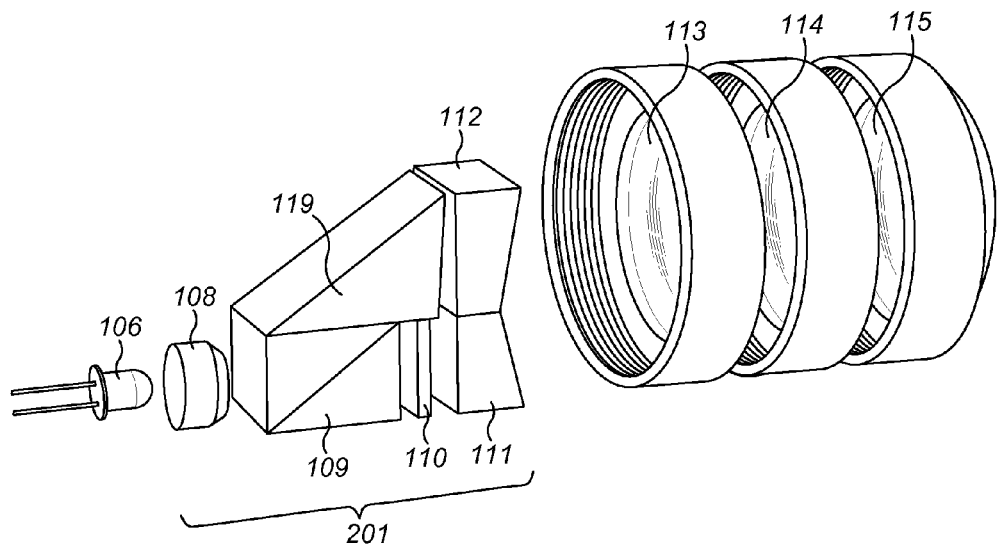
FIG. 2 shows a set of optical elements for the light pen, in one embodiment.

FIG. 2 shows the details of the optical block 201 consisting of a truncated cone shaped collimating optical element 108, a broad band polarization divider 109 and 119, a broadband semi-wave plate 110, shifting bi-prism and light beam coupler 111 and 112. The set of lenses 113, 114 and 115 are shown as well. The radii of these lenses are determined based on the need of the intensity of the light beam and focus area. They can easily be changed to different lenses having different radii. The LED bulb 106 sits in front of the truncated cone shaped collimating optical element 108.

Figure 3:
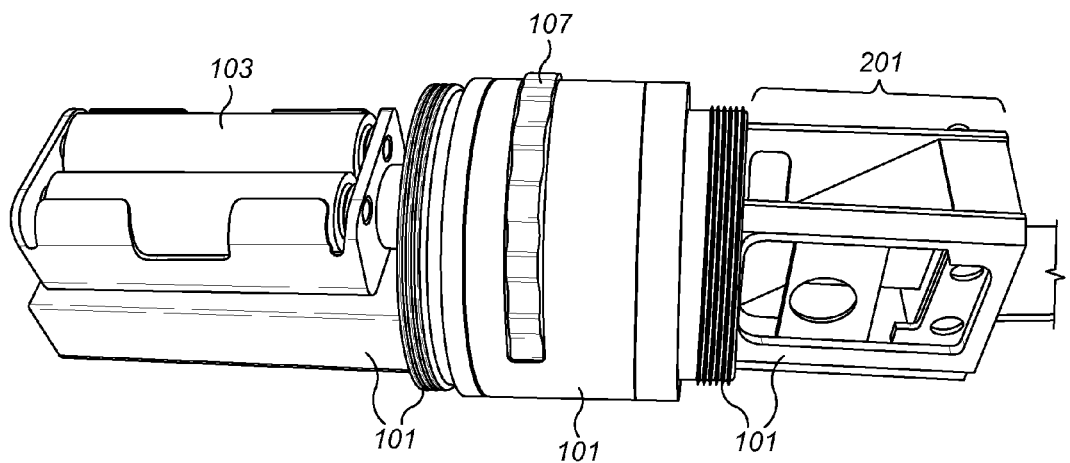
FIG. 3 shows various parts being assembled in a particular order, in one embodiment.

FIG. 3 shows a view of the light pen wherein the covers have been taken off and the battery 103, the toggle 107 and the optical unit 301 and the joining section of two functional units 101 are shown. This figure shows the modularity of the light pen. The dismantable covers allows the internal parts to be swapped. Specifically if the number of lenses need to be increased or decreased. Also the battery swaps can be done easily. The unit 101 that houses the optical block 201 can also be removed and the LED can be replaced if necessary.

Figure 4:
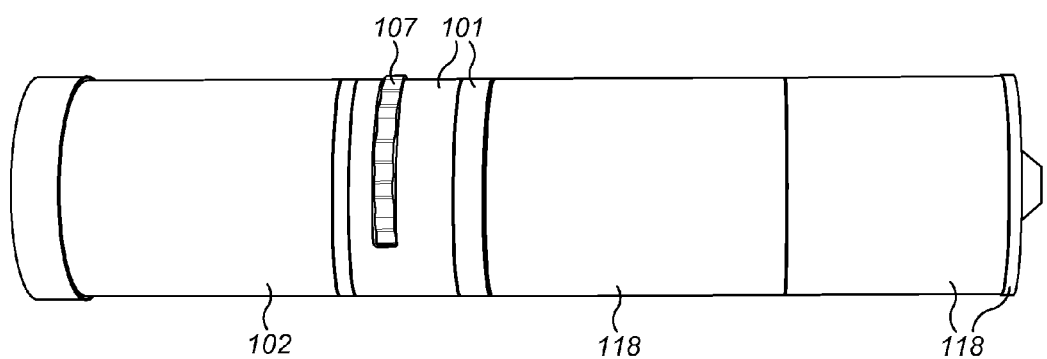
FIG. 4 shows the outer view of the assembled light pen, in one embodiment.

FIG. 4 shows a complete light pen that has two casings and that can be opened to replace battery in the power supply block 103 and the joined at 101. The toggle 107 can be used for changing the selection of the LED lights from red, green and blue. The entire light pen may be used as a hand held device or mounted on automation device and/or robotic arm to write on polarized light sensitive surfaces. It may be used in security papers, immigration papers, counterfeit detection, authentication verification, health care documents, identification cards, immigration cards, licenses, passport, hard drives, computer components, articles of wear such as shoes etc., articles that need tracking such as packages, weapons, currency etc., classified documents etc. Once the material polarization sensitive material may be incorporated partially in documents or objects and the light pen can be used to write on it. The product when in use can be scrutinized under special light so it is visible only to the person who has the light source. Accordingly, the specification and drawings are to be regarded in an illustrative rather than a restrictive sense.

What is claimed is:

1. An apparatus, comprising;
a toggle for selecting a specific light emitting diode to produce a light beam, wherein the specific light emitting diode is at least one of a red, green and blue;
a polarization block consisting of a truncated cone shaped collimating optical element, a broad band polarization divider, a broadband semi-wave plate and a light beam coupler;
a set of projection lens, wherein the set of projection lens is made of at least one of a two, three, four, five and six lenses; and
a power supply block for the apparatus.

2. The apparatus of claim 1, wherein the set of projection lens is four.

3. The apparatus of claim 1, further comprising;
a housing to enclose the toggle, the polarization block, the set of projection lenses and the power supply; and
a switch for controlling the apparatus in on and off position.

4. The apparatus of claim 2, wherein a first side of the housing houses the power supply unit and a second side has a narrow aperture for the light beam to pass through.

5. The apparatus of claim 1, wherein the projection lens is made up of a specific shape and specific thickness.

6. A method, comprising:
generating a power to light up a light emitting diode;
choosing the light emitting diode to emit a specific type of a light beam;
generating an optical radiation using the light emitting diodes in the form of an non-polarized light;
collecting the non-polarized light that is non-homogeneous and converting it to a homogeneous non-polarized light using a truncated cone shaped collimating optical element;
dividing the homogeneous non-polarized light into a first beam and a second beam that are orthogonally linearly polarized beam to each using a broad band polarization divider;
passing the first beam through a broadband semi-wave plate to change the polarization plane to 90 degrees and form a polarized light;
passing the second beam through a prism to convert it into a polarized light;
collimating the divided first beam and second beam that is a total polarized light through a light beam coupler; and
focusing the total polarized light using set of projection lens having a specific shape and specific curvature to produce a focused optical system that would be used for writing on polarized light sensitive surface.

7. The method of claim 6, wherein the set of projection lens has a number of at least one of a two, three, four and five lenses.

8. The method of claim 7, wherein the set of projection lens is four lenses.

9. The method of claim 6, the specific shape is convex.

10. The method of claim 6, wherein the set of projection lens is four lenses, wherein the specific curvature is radii of curvature of a first lens is 136.14 and −109.9 mm, a second lens is 41.3 mm and 124.74 mm; a third lens is 21.38 and 28.256 mm and a fourth lens is 12 mm and 10 mm.

11. The method of claim 6, wherein the polarized light sensitive surface are layers of a silicon dioxide ($SiO_2$) with the refraction index of 1.45 and a Niobium pentoxide ($Nb_2O_5$) with the refraction index of 2.25.

\* \* \* \* \*